United States Patent
Tucker (10) Patent No.: US 7,370,918 B2
(45) Date of Patent: May 13, 2008

(54) WHEEL ASSEMBLY FOR A TRACKED VEHICLE AND ANTI-ACCUMULATION SLEEVE THEREFOR

(75) Inventor: Jasper J. Tucker, Medford, OR (US)

(73) Assignee: Tucker Sno-Cat Corporation, Medford, OR (US)

( * ) Notice: Subject to any disclaimer, the term of this patent is extended or adjusted under 35 U.S.C. 154(b) by 256 days.

(21) Appl. No.: 11/142,129

(22) Filed: May 31, 2005

(65) Prior Publication Data

US 2006/0267405 A1    Nov. 30, 2006

(51) Int. Cl.
  *B60S 1/62* (2006.01)
(52) U.S. Cl. .................................. 305/115; 305/100
(58) Field of Classification Search ............... 305/136, 305/100, 107–111, 115
See application file for complete search history.

(56) References Cited

U.S. PATENT DOCUMENTS

| | | | |
|---|---|---|---|
| 3,155,436 A * | 11/1964 | Bonmartini ................. | 305/115 |
| 3,787,099 A | 1/1974 | Tucker et al. | |
| 3,857,616 A | 12/1974 | Tucker et al. | |
| 5,279,332 A * | 1/1994 | Winter et al. ............... | 138/111 |
| 5,367,971 A * | 11/1994 | Carpenter et al. .......... | 114/243 |
| 5,713,644 A * | 2/1998 | Freeman ...................... | 305/110 |
| 5,899,541 A * | 5/1999 | Ying et al. ................... | 305/115 |
| 5,938,301 A * | 8/1999 | Hostetler et al. ........... | 305/199 |
| 6,007,166 A | 12/1999 | Tucker et al. | |
| 6,019,443 A * | 2/2000 | Freeman ...................... | 305/110 |
| 6,129,426 A * | 10/2000 | Tucker ........................ | 305/136 |
| 6,217,455 B1 * | 4/2001 | Yanata ........................ | 464/113 |
| 6,231,136 B1 * | 5/2001 | Freeman ...................... | 305/107 |
| 2005/0056468 A1 | 3/2005 | Tucker | |
| 2005/0269877 A1 * | 12/2005 | Breton et al. ................ | 305/107 |

* cited by examiner

*Primary Examiner*—Jason R. Bellinger
(74) *Attorney, Agent, or Firm*—Klarquist Sparkman, LLP (57) ABSTRACT

The present disclosure concerns embodiments of an improved wheel assembly for a drive track unit of an all-terrain vehicle that inhibits the accumulation of snow, ice and/or other matter between the track and the wheel assembly. In one implementation, an improved guide wheel assembly for a track unit has a rotatable hub and at least two axially spaced apart guide wheels mounted to the hub that engage the inner surface of an endless track. A flexible and/or deformable sleeve covering the outer surface of the hub is capable of deforming under external pressure applied to the sleeve through contact with snow and/or ice as the vehicle traverses the ground. The deformation of the sleeve is effective to inhibit snow and/or ice from adhering to the sleeve outer surface. Hence, disengagement of the track from the guide wheels caused by accumulated ice and/or snow can be avoided.

24 Claims, 9 Drawing Sheets

WHEEL ASSEMBLY FOR A TRACKED VEHICLE AND ANTI-ACCUMULATION SLEEVE THEREFOR

FIELD

The present disclosure relates to all-terrain tracked vehicles, and more particularly, to an improved wheel assembly for such tracked vehicles.

BACKGROUND

Endless track-driven vehicles are commonly used off-road in difficult terrain and under difficult terrain conditions, such as in mud, snow, sand, and tundra. For example, tracked vehicles are used in snow country for grooming ski slopes and snow mobile trails, for transporting skiers to back-country slopes, for ski resort maintenance work, and for snow and mountain rescue. They are also used in various types of terrain for utility company maintenance work, and for oil exploration and oil pipeline maintenance in arctic tundra.

Tracked vehicles are generally of two types. Many are two-tracked in which a pair of endless drive track units, one on each of the opposite sides of the vehicle, support and drive the vehicle. Others are four-tracked, in which four separately driven and independently suspended drive track units, two in front and two in the rear, support and drive the vehicle.

Four-tracked vehicles have certain advantages over two-tracked vehicles under extreme conditions such as on steep slopes and in very rough terrain because of the flexible independent suspensions of the track drive units and the constant power available to all of the track drive units, even while turning. Unlike a two-tracked vehicle which relies on the differential speed of the two tracks for turning, a four-tracked vehicle steers much like a wheeled vehicle. Its endless drive track units can be physically turned for steering.

In many tracked vehicles, such as the four tracked vehicles shown in U.S. Pat. No. 6,007,166, the lower, ground-engaging run of the track has been supported by a plurality of single-element guide wheels disposed substantially inline longitudinally of the track and generally engaging only a centralized region of the track. Although this system, with a single line or row of guide wheels, functioned adequately, it was found that substantial deflection of the track on opposite sides of the guide wheels was occurring. This deflection was caused generally by the high-point loading of the track by the guide wheels at the center of the lateral dimensions of the track. This could lead to premature failure of elements in the track due to high cyclical stresses. This same high-point loading of the track and its consequential deflection could also lead to premature failure of the track and reduce its effective traction. The high-point loading of the track can also be transmitted through the track to the underlying terrain. In the case of sensitive terrain such as tundra, such loading could cause excessive damage to the terrain, especially with an endless track that includes traction bars or cleats on its outer surface for enhancing the vehicle's traction.

The drive track unit disclosed in U.S. Pat. No. 6,129,426, addressed the foregoing problems by providing guide wheel assemblies along the lower track run, with each assembly including multiple guide wheels mounted on a common guide wheel hub. This increased the guide wheel surface contact area across the width of the track, thereby reducing point loading of the track and consequential track deflection and wear, as well as terrain damage. Although this was a substantial improvement over the prior art, a problem with such guide wheel assemblies is that snow and/or ice can adhere to the outer surface of the hub between the guide wheels. Once a snow/ice layer is formed over the hub, additional snow and/or ice can quickly accumulate between the wheels, which can cause the track to "derail" or disengage from the guide wheels.

SUMMARY

The present disclosure concerns embodiments of an improved wheel assembly for a drive track unit of an all-terrain vehicle that inhibits the accumulation of snow, ice and/or other matter between the track and the wheel assembly. The wheel assembly includes a sleeve extending around the rotatable hub of the wheel assembly and having a deformable and/or flexible outer surface portion that is capable of deforming under external pressure applied to the sleeve through contact with snow, ice, or other matter as the vehicle traverses the ground. The deformation of the sleeve is effective to inhibit snow, ice, or other matter from adhering to the sleeve outer surface between the wheels of the wheel assembly. As a result, disengagement of the track from the wheel assembly caused by accumulated ice, snow, and/or other matter can be avoided.

The deformable outer surface portion of the sleeve preferably is an uneven surface portion, for example, a plurality of projections and/or pockets formed on the sleeve. In certain embodiments, the sleeve comprises a plurality of deformable, circumferentially spaced projections formed on the outer surface of the sleeve. The projections desirably are elongated axially of the sleeve and are equally spaced around the circumference of the sleeve so as to define a plurality of axially extending pockets, or channels, between adjacent projections. The resulting pressure angles on the projections and flexure of the projections assists in releasing snow and/or ice that comes in contact with the sleeve outer surface.

The portion of the hub outer surface covered by the sleeve can be formed with one or more recesses. The sleeve therefore can flex radially inwardly into the recesses of the hub under external pressure applied to the sleeve. The additional flexure of the sleeve further inhibits the adherence of snow and/or ice on the outer surface of the sleeve.

In one implementation, the wheel assembly comprises a guide wheel assembly for a track unit and the sleeve is mounted on the hub between the guide wheels of the guide wheel assembly. In another implementation, the wheel assembly comprises a drive wheel assembly for a track unit and the sleeve is mounted on the hub between the drive sprocket wheels of the drive wheel assembly.

In one representative embodiment, a wheel assembly for an endless drive track of a drive track unit of an all-terrain vehicle comprises a rotatable hub having an outer surface and at least first and second wheels mounted to opposite sides of the hub for engaging the track. A sleeve extends around the outer surface of the hub and has an outer surface spaced from the track. The outer surface of the sleeve defines a plurality of circumferentially spaced-apart, deformable projections. External pressure on the sleeve during use causes the sleeve to deform, thereby inhibiting the accumulation of snow or ice on the outer surface of the sleeve.

In another representative embodiment, a guide wheel assembly for an endless drive track of a drive track unit of an all-terrain vehicle comprises a rotatable hub having an outer surface and at least first and second axially spaced apart guide wheels coupled to the hub for engaging the track. An elastomeric sleeve extends around the outer surface of the hub and has an outer surface spaced from the track. The sleeve outer surface defines a plurality of circumferentially spaced pockets elongated in a direction extending between opposite end portions of the sleeve. Flexure of the sleeve through contact with snow or ice is effective to inhibit the accumulation of snow or ice on the outer surface of the sleeve.

In another representative embodiment, a wheel assembly for an endless drive track of a drive track unit of an all-terrain vehicle comprises a rotatable hub having an outer surface and at least first and second wheels coupled to opposite sides of the hub for engaging the track. A sleeve extends around the outer surface of the hub and has an outer surface spaced from the track. The outer surface comprises a deformable surface portion, wherein external pressure on the sleeve during use causes the deformable surface portion to deform, thereby inhibiting the accumulation of snow or ice on the outer surface of the sleeve.

In another representative embodiment, a sleeve is provided for use in a wheel assembly of a drive track unit of an all-terrain vehicle in which the wheel assembly has at least two spaced apart wheels. The sleeve comprises a deformable outer surface portion, wherein deformation of the outer surface portion through contact with snow or ice is effective to inhibit the accumulation of snow or ice on the sleeve.

In another representative embodiment, a sleeve for use in a wheel assembly of a drive track unit of an all-terrain vehicle comprises a plurality of deformable projections, wherein deformation of the projections through contact with snow or ice is effective to inhibit the accumulation of snow or ice on the sleeve.

In another representative embodiment, a track unit for a track-driven all-terrain vehicle comprises a track frame, a drive wheel assembly that is rotatably mounted to the frame, and plural guide wheel assemblies that are rotatably mounted to the frame. An endless track is trained about the drive wheel assembly and the guide wheel assemblies and is drivingly engaged by the drive wheel assembly. At least one of the guide wheel assemblies comprises a rotatable hub, at least first and second guide wheels coupled to the hub and engaging the track, and an elastomeric sleeve covering the hub. The sleeve has an outer surface formed with a plurality of circumferentially spaced, axially extending pockets. Deformation of the sleeve through contact with snow or ice is effective to inhibit the adherence of snow or ice on the outer surface of the sleeve.

The foregoing and other objects, features, and advantages of the invention will become more apparent from the following detailed description, which proceeds with reference to the accompanying figures.

DETAILED DESCRIPTION

As used herein, the singular forms "a," "an," and "the" refer to one or more than one, unless the context clearly dictates otherwise.

As used herein, the term "includes" means "comprises."

The present disclosure concerns embodiments of an improved wheel assembly for a track unit of an all-terrain vehicle, such as disclosed in U.S. Pat. Nos. 6,129,426, 6,007,166, 3,787,099, and 3,857,616, that inhibits the accumulation of snow and/or ice between the track and the wheel assembly. To provide a comprehensive disclosure without unduly lengthening the specification, applicant incorporates herein by reference the disclosures of U.S. Pat. Nos. 6,129,426, 6,007,166, 3,787,099, and 3,857,616.

Figure 1:
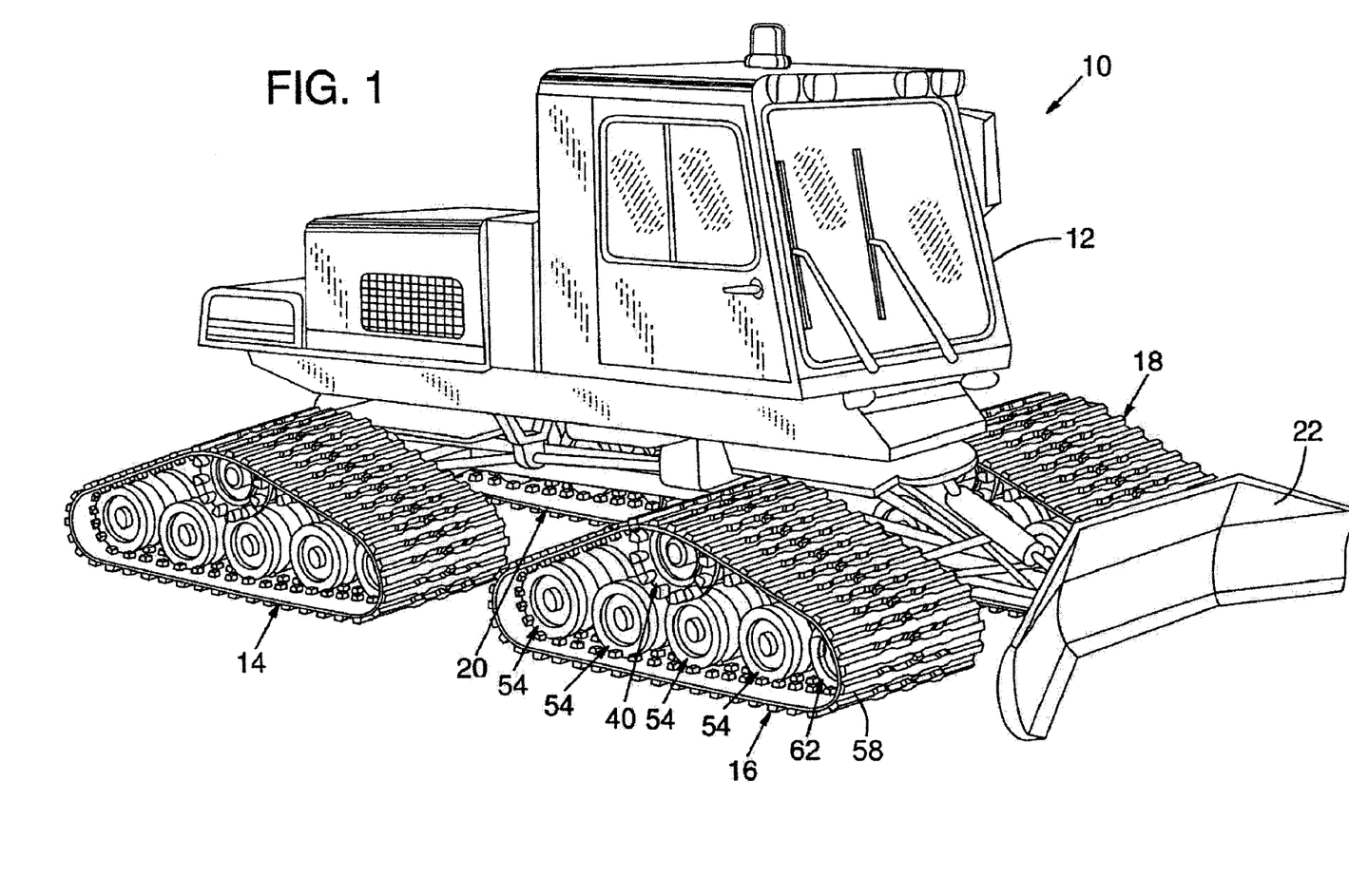
FIG. 1 is a perspective view of a four-tracked all terrain vehicle having endless track units supported on guide wheel assemblies, according to one embodiment.

Referring first to FIG. 1, a four-tracked all-terrain vehicle 10 is shown having a vehicle body 12 supported by four identical endless track units 14, 16, 18, and 20, respectively. The track assemblies 14 and 20 are mounted at opposite sides of the rear of the vehicle, while the track assemblies 16, 18 are mounted at opposite sides of the front of the vehicle. Each endless track assembly is independently mounted, driven and steerable in a well-known manner. At the forward end of the vehicle a snow plow, or grader blade, 22 is illustrated. It should be recognized that a vehicle as shown is adapted to have a variety of attachments mounted at its front or rear ends for multiple operations over a variety of terrain, as well as a variety of body types for various purposes.

Figure 2:
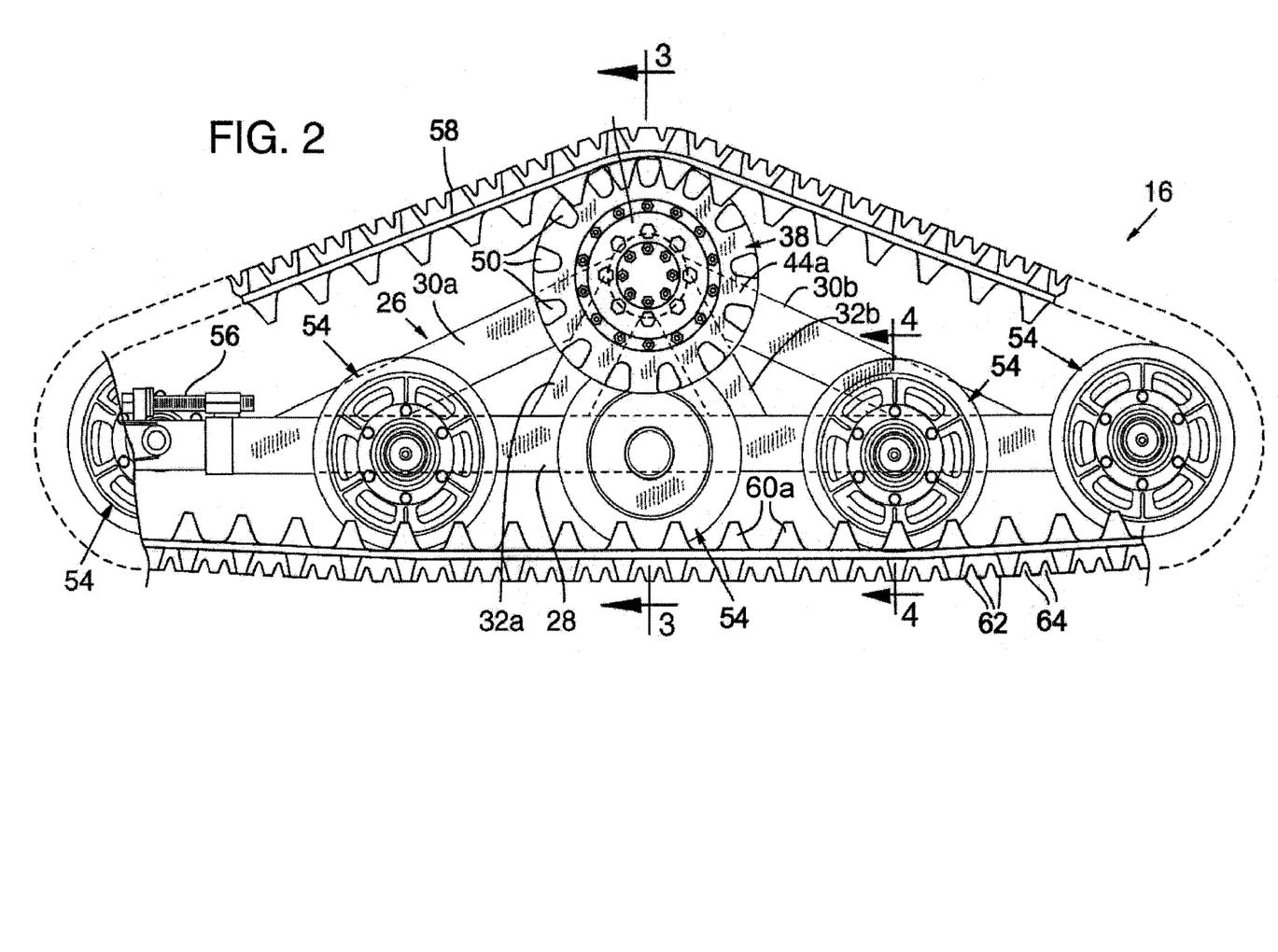
FIG. 2 is an enlarged side elevation view of an endless track unit of the vehicle shown in FIG. 1.
Figure 3:
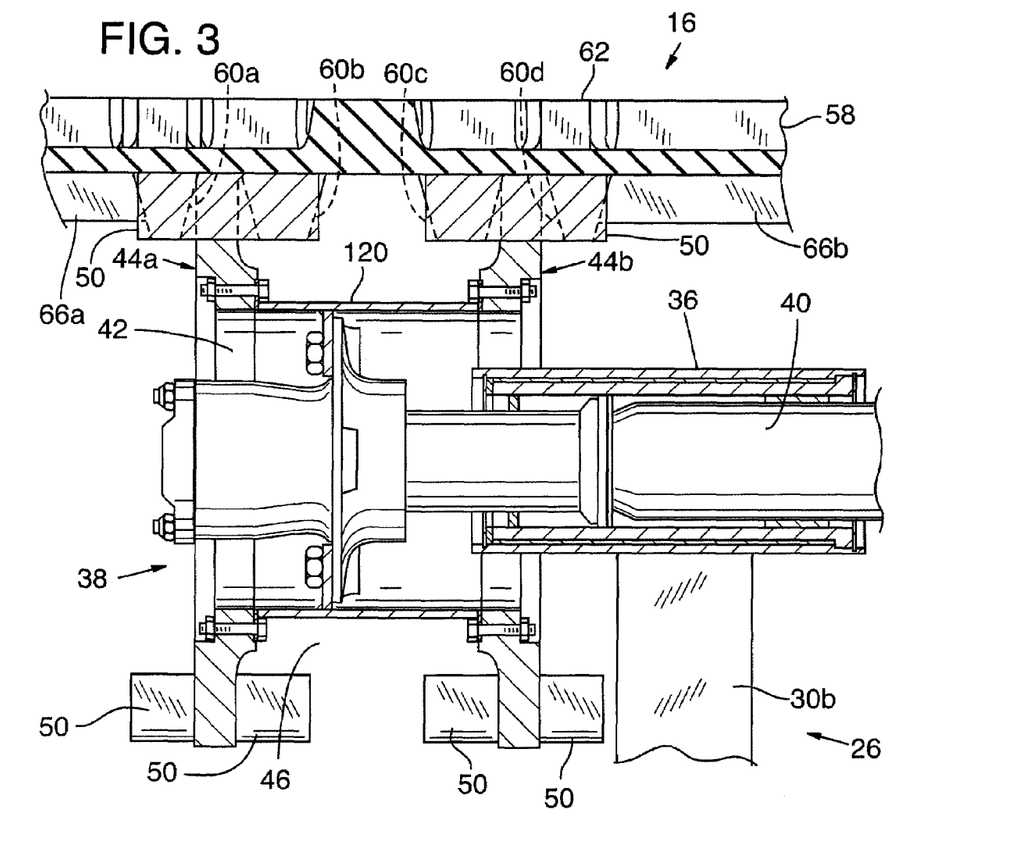
FIG. 3 is an enlarged, fragmentary cross sectional view of the track and drive wheel assembly of FIG. 2 taken generally along line 3-3 in FIG. 2.

Referring to FIGS. 2 and 3, one of the track units 16 is illustrated in greater detail. The track unit 16 is mounted to the vehicle body through a frame structure 26. The frame structure 26 includes an elongate and substantially horizontal beam 28 extending longitudinally of the track unit 16 and a set of diverging outer legs 30a and 30b and a set of diverging inner legs 32a, 32b. The upper ends of legs 30a, 30b, 32a, 32b are secured to a journal tube 36 (FIG. 3) which is mounted to the chassis of the vehicle body 12. The divergent lower ends of the inner and outer legs are secured to beam 28.

The track unit 16 has a drive wheel assembly 38 at the apex of a generally triangularly-shaped path for an endless track 58. The drive wheel assembly 38 is rotatably driven by a powered axle 40 extending through journal tube 36. The drive wheel assembly 38 includes a drum, or hub, 42 with sprocket discs 44a, 44b (also referred to herein as sprocket wheels) mounted at opposite ends of the drum (FIG. 3). Opposed sprocket discs 44a, 44b are axially spaced apart to form a gap 46 therebetween.

Each sprocket disc 44a, 44b has a plurality of track engaging members in the form of cogs 50 equally-spaced about the circumference of the disc, with each cog 50 rigidly secured thereto and extending perpendicularly outwardly therefrom. Each cog 50 forms a tooth for the sprocket disc.

As shown in FIG. 2, five lower, freely rotatable guide wheel assemblies 54 are spaced in a line extending longitudinally of the track assembly and alongside beam 28. The guide wheel assemblies 54 can be equally spaced along the beam 28, or alternatively, the spacing between the guide wheel assemblies can vary, depending on the particular track unit configuration. The rearmost wheel assembly 54 is mounted on a telescoping wheel support 56. The telescoping wheel support includes a threaded adjustment assembly which when rotated either extends or retracts the rearmost guide wheel assembly 54 longitudinally of the track assembly. While the illustrated track unit 16 has five guide wheel assemblies, a greater or fewer number of guide wheel assemblies can be used.

The endless track 58 is trained about the outside of drive wheel assembly 38 and guide wheel assemblies 54 to form a generally triangularly-shaped track run. In alternative embodiments, the track unit can a drive wheel assembly that is positioned substantially in-line with the guide wheel assemblies, for example in front of the forwardmost guide wheel assembly or in back of the rearmost guide wheel assembly.

As best shown in FIG. 2, the track 58 in the illustrated configuration generally is a one piece, endless molded rubber belt with internally cast composite stiffener rods (not shown) preferably of fiberglass composite, rubber, and/or aluminum, and positioned, for example, every 4.166 inches, extending perpendicular to the track run. Internally cast flexible, stretched-resistant cords (not shown) preferably constructed of a combination of kevlar, nylon, and steel cable extend parallel to the track run. One known manufacturer of endless tracks containing such materials is Camoplast, Inc., located in Plattsburgh, N.Y.

Molded drive lugs 60a, 60b, 60c, 60d molded in place and preferably constructed of hard rubber are positioned on the inside of track 58 to engage and mesh with cogs 50 for driving the track 58. As is seen the illustrated drive lugs are generally truncated pyramid-shaped, although they can have other suitable shapes. The drive cogs 50 are positioned and shaped to enter the spaces between longitudinally aligned drive lugs 60a, 60b, 60c, 60d to drive the track.

As shown in FIGS. 2 and 3, the molded track, or tread, has traction bars 62, preferably of rubber, extending laterally across the outside of the track 58. These are substantially equally spaced around the track periphery. Transversely extending grooves 64 in the tread further improve traction for the vehicle.

A pair of scrapers 66a, 66b (FIG. 3) constructed of hard rubber, molded in place as part of the track and having a generally triangular cross-section, are positioned on the inside of the track. The scrapers are positioned to travel along the path of the track and to aid in clearing debris, such as snow, ice, sand, etc., should it build up in the area about journal assembly 36.

Figure 4:
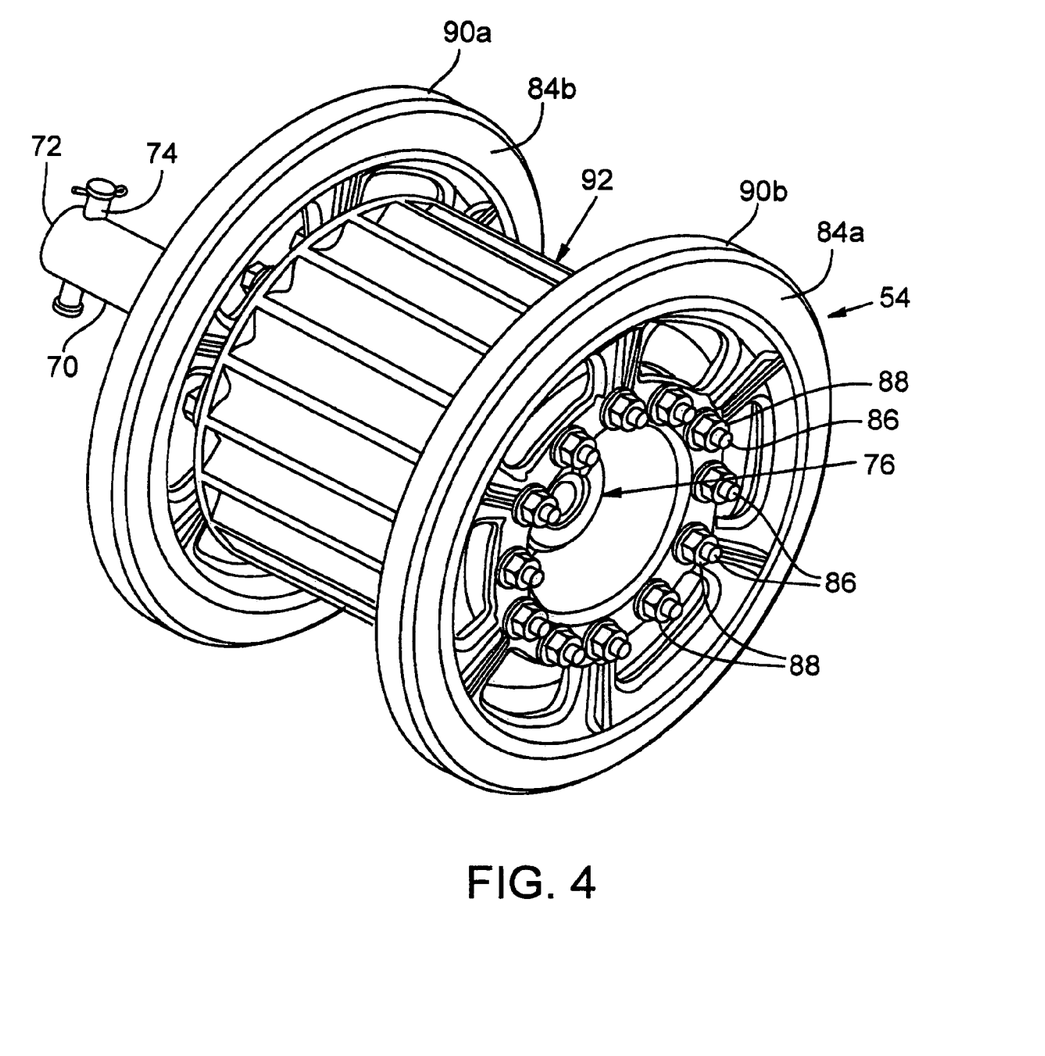
FIG. 4 is an enlarged perspective view of one of the guide wheel assemblies of the track unit shown in FIG. 2.
Figure 5:
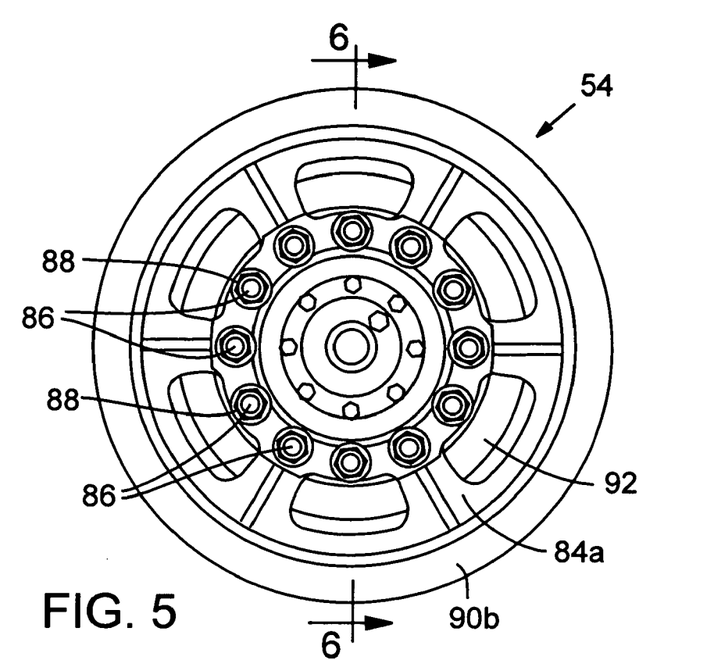
FIG. 5 is an enlarged side elevation view of the guide wheel assembly shown in FIG. 4.
Figure 6:
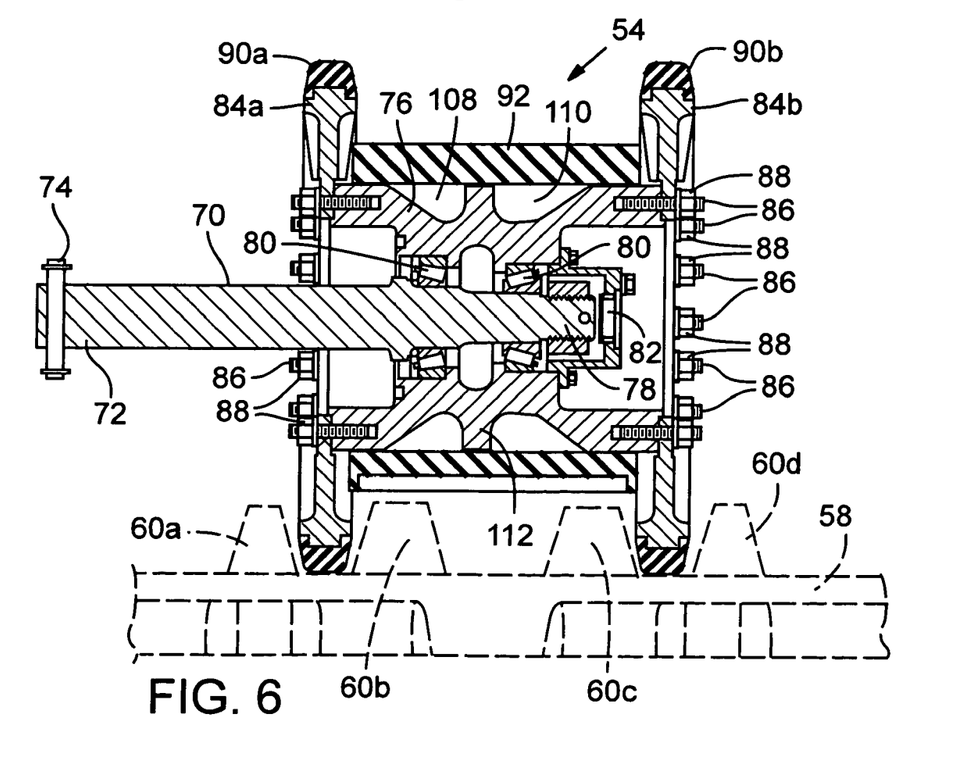
FIG. 6 is an enlarged cross sectional view of the guide wheel assembly taken generally along line 6-6 of FIG. 5.

FIGS. 4-6 show one of the guide wheel assemblies 54 in greater detail. The illustrated guide wheel assembly 54 includes a spindle, or axle, 70 having an end portion 72 that extends through a corresponding opening in beam 28 (FIG. 2). The spindle 70 is secured to beam 28, such as by a removable pin 74 that extends through the end portion 72. A hub 76 is rotatably mounted on the opposite end portion 78 of the spindle 70 through bearings 80 and is locked thereon by a nut 82 (as best shown in FIG. 6).

First and second, axially spaced apart guide wheels 84a and 84b are mounted on opposite sides of the hub 76 by bolts 86 and nuts 88. The wheels 84a, 84b can have elastomeric outer coverings 90a and 90b, respectively, that contact the inner surface of the track 58. The outer coverings 90a, 90b can be made of rubber or polyester material to provide cushioning between the track 58 and the guide wheel assembly 54.

Extending axially between the guide wheels 84a, 84b and around the outer surface of the hub 76 is a deformable sleeve, or outer covering, 92 that functions to inhibit the accumulation of ice, snow, mud or other matter on the outer surface of the hub. The sleeve 92 preferably is made of an elastomeric material, such as rubber or urethane, that can deform or flex under external pressure applied to the sleeve through contact with snow and/or ice (or other matter) as the vehicle traverses the ground. As shown, the sleeve 92 desirably covers the entire outer surface of the hub 76 between the guide wheels 84a, 84b to prevent ice and/or snow from contacting the outer surface of the hub. In other embodiments, the sleeve 92 can be sized to cover less than the entire outer surface of the hub. For example, the sleeve 92 can be sized to cover only a center portion of the hub outer surface.

Figure 7:
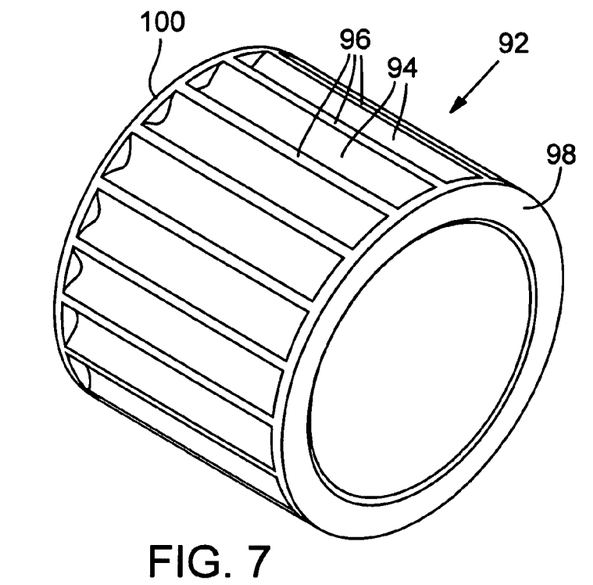
FIG. 7 is an enlarged perspective view of the flexible sleeve of FIG. 4 shown removed from the guide wheel assembly for clarity.
Figure 8:
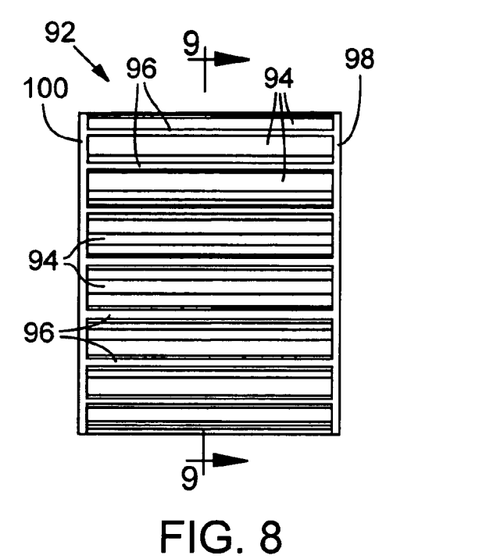
FIG. 8 is an enlarged side elevation view of the flexible sleeve shown in FIG. 7.
Figure 9:
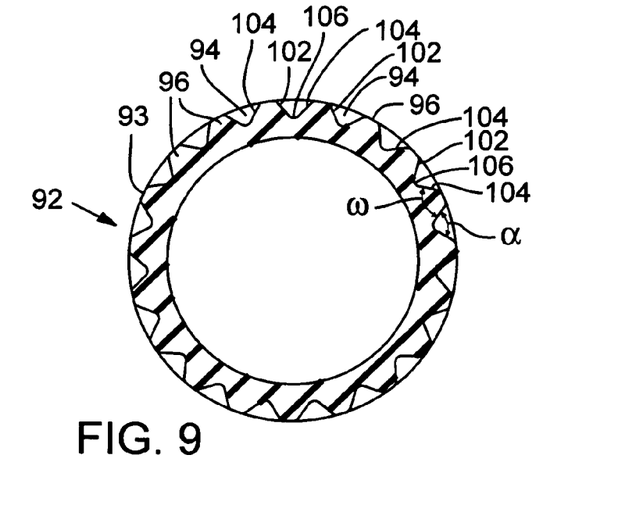
FIG. 9 is an enlarged cross sectional view of the flexible sleeve taken generally along line 9-9 of FIG. 8.

Referring also to FIGS. 7-9, the sleeve 92 has an outer surface 93 formed with a plurality of circumferentially spaced and axially extending raised rib portions, or projections, 96 that are equally spaced around the hub. A plurality of axially extending pockets, or cavities, 94 are defined between adjacent projections 96. The projections 96 and the pockets 94 desirably extend at least the majority of the length of the sleeve 92 (as measured in the axial direction, or along the longitudinal axis, of the sleeve) (i.e., the projections and the pockets extend at least half the length of the sleeve) and can extend substantially the entire length of the sleeve 92 as shown. In other embodiments, the pockets can extend less than the majority of the length of the sleeve.

The sleeve 92 can include end walls 98, 100 at opposite ends of the sleeve forming respective end walls of the pockets 94. As best shown in FIG. 9, each projection 96 has sloped side surfaces 102 and 104 extending axially between end portions 98, 100 and converging toward each other in a radial outward direction. Each pocket 94 has a curved bottom surface 106 extending between surfaces 102, 104 of an adjacent pair of projections 96. In other embodiments, the projections and/or pockets can have other cross-sectional profiles. For example, projections can have a generally square or rectangular cross-sectional profile with non-sloped side surfaces and the pockets can have flat bottom surfaces.

As shown in FIG. 9, each pocket 94 is defined by surfaces 102, 104 of adjacent projections that define an angle α. The surfaces 102, 104 of each projection define an angle ω. In particular embodiments, the angle α is about 90 degrees and the angle ω is about 20 to 75 degrees, with 71 degrees being a specific example. However, these angles can be varied as needed in different situations or applications.

In certain embodiments, the sleeve 92 is molded from a suitable elastomeric material and has a one-piece, monolithic construction as shown. As used herein, the term "monolithic construction" refers to a construction that does not include any welds, fasteners, adhesives, or other means for securing separately formed pieces of material to each other. In alternative embodiments, however, the sleeve can comprise multiple pieces secured to each other and/or to the hub outer surface. In one implementation, for example, the sleeve 92 can have a base layer, which can be made of an elastomeric or non-elastomeric material, and a plurality of deformable projections made of an elastomeric material and secured to the base layer.

As the vehicle traverses the ground, pressure is applied to the outer surface of the sleeve 92 through contact with snow and/or ice (or other matter), causing the projections 96 to flex. The sloped side surfaces 102, 104 of the projections 96 provide a varying contact surface (that is, the sleeve outer surface contacting the snow and/or ice does not have a constant outer diameter) that effectively varies the resulting pressure angles on the sleeve outer surface as the sleeve rotates over the ground. The flexure of the projections 96 and the resulting pressure angles against the sleeve outer surface inhibits the adherence and subsequent built up of snow and/or ice (or other matter) on the outer surface of the sleeve 92. The curved bottom surfaces 106 between the projections 96 also facilitates the release of snow and/or ice from the sleeve. Hence, disengagement of the track 58 from the guide wheels 90a, 90b caused by accumulated snow and ice can be avoided.

As shown in FIG. 6, the outer surface of the hub 76 can be formed with one or more continuous annular recesses 108, 110 extending around the hub. A continuous annular flange 112 located generally at the middle of the hub separates the recesses 108, 110 and supports the sleeve 92 between the recesses. The recesses 108, 110 allow the sleeve 92 to flex radially inwardly under external pressure applied to the sleeve. The additional flexure of the sleeve 92 further assists in releasing snow and/or ice that comes in contact with the outer surface 93 of the sleeve 92.

As shown in FIG. 3, a deformable sleeve 120 having a construction similar to that of the sleeve 92 can be used to cover the outer surface of the drive wheel hub 42 between the sprocket discs 44a, 44b to inhibit the accumulation of snow and/or ice on the drive wheel assembly 38. The hub 42 can be formed with one or more annular recesses (not shown) to allow the sleeve 120 to flex radially inwardly under external pressure applied to the sleeve.

The sleeves 92, 120 (or any of the other sleeves disclosed herein) are not restricted in use to the specific guide wheel assembly, drive wheel assembly, track, or track unit shown in the illustrated embodiment. Accordingly, the sleeves 92, 120 (or any of the other sleeves disclosed herein) can be implemented in various types of wheel assembly, track, or track unit configurations.

For example, the sleeve 92 can be implemented in a guide wheel assembly having three or more spaced-apart guide wheels or in a drive wheel assembly having three or more spaced-apart sprocket drive wheels. In one embodiment, for example, a guide wheel assembly comprises a hub and three guide wheels mounted to the hub in an axially spaced relationship, such as disclosed in U.S. Pat. No. 6,129,426. Multiple sleeves 92 cover the outer surface of the hub between adjacent guide wheels.

Figure 10:
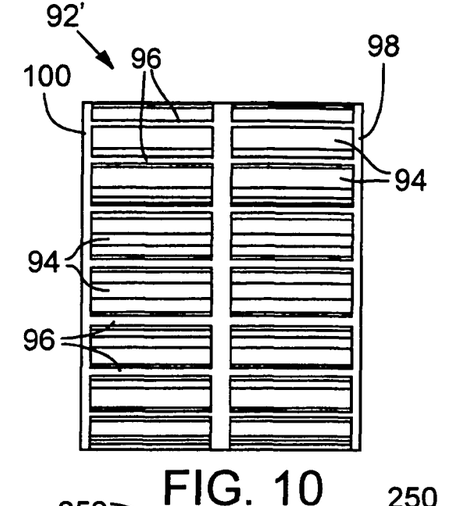
FIG. 10 is an enlarged side elevation view of a flexible sleeve that can be used in the guide wheel assembly shown in FIG. 4, according to another embodiment.

FIG. 10 shows a deformable sleeve 92', according to another embodiment, that can be used in the guide wheel assembly 54 and/or the drive wheel assembly 38. The sleeve 92' is similar in construction to the sleeve 92 except that the sleeve 92' is formed with a circumferentially extending rib portion 150 so as to define rows of axially spaced-apart pockets 94. The sleeve 92' can be formed with additional circumferentially extending rib portions 150 so as to form rows of three or more axially spaced-apart pockets. In an alternative embodiment, the sleeve 92' can be formed with one or more circumferentially extending grooves (not shown) where the rib portions 150 are located so as to form rows of axially spaced-apart, discrete projections.

Figure 11A:
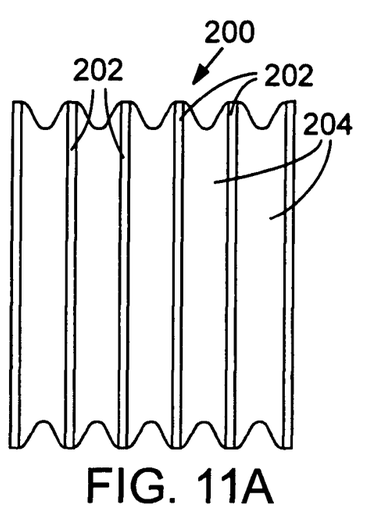
FIGS. 11A and 11B are enlarged side elevation and perspective views, respectively, of a flexible sleeve that can be used in the guide wheel assembly shown in FIG. 4, according to another embodiment.
Figure 11B:
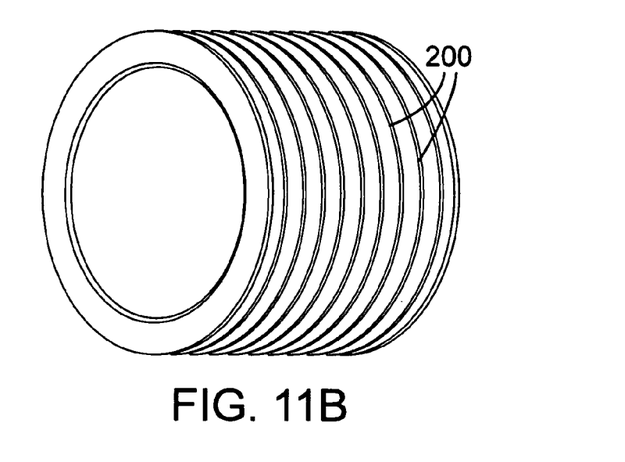

FIGS. 11A and 11B show a deformable sleeve 200, according to another embodiment, that can be used in the guide wheel assembly 54 and/or the drive wheel assembly 38. The sleeve 200 includes a plurality of axially spaced-apart ribs or projections 202 that extend continuously around the circumference of the sleeve. A plurality of annular grooves, or pockets, 204 are defined between adjacent projections 202.

Figures 12, 13, 14A:
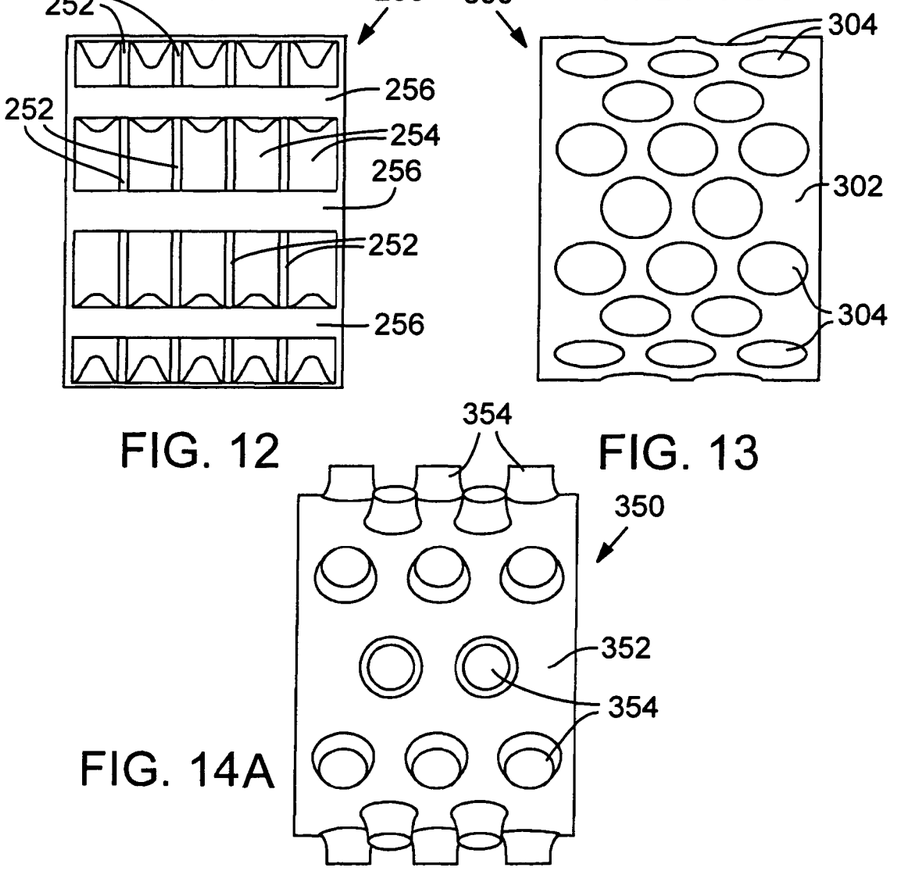
FIG. 12 is an enlarged side elevation view of a flexible sleeve that can be used in the guide wheel assembly shown in FIG. 4, according to another embodiment.
FIG. 13 is an enlarged side elevation view of a flexible sleeve that can be used in the guide wheel assembly shown in FIG. 4, according to another embodiment.
FIGS. 14A-14G show various embodiments of sleeves having deformable projections that can be used in the guide wheel assembly shown in FIG. 4.

FIG. 12 shows a deformable sleeve 250, according to another embodiment, that can be used in the guide wheel assembly 54 and/or the drive wheel assembly 38. The sleeve 250 is formed with a series of non-continuous, circumferentially extending, axially spaced-apart ribs, or projections, 252, alternating with circumferentially extending, axially spaced-apart grooves, or pockets, 254. A series of axially extending, circumferentially space-apart rib portions 256 separate the grooves 254 into discrete rows of grooves 254 extending axially of the sleeve 250. In an alternative embodiment, a series of grooves (not shown) can be formed where the rib portions 256 are located so as to separate the projections 252 into discrete axially extending rows of projections 252, with the rows being circumferentially spaced-apart from each other.

FIG. 13 shows a deformable sleeve 300, according to another embodiment, that can be used in the guide wheel assembly 54 and/or the drive wheel assembly 38. The sleeve 300 has an outer surface 302 and a plurality of recesses, or pockets, 304 formed in the outer surface. The pockets 304 in the illustrated configuration are generally circular in shape. However, the pockets 304 can have various other shapes, such as a square, rectangle, triangle, diamond, or various combinations thereof. The pockets 304 can be arranged in rows of pockets, for example axially extending rows of three pockets each alternating with axially extending rows of two pockets each as shown. Alternatively, the sleeve 300 can have an irregular pattern of pockets 304 randomly positioned in the outer surface 302.

FIG. 14A shows a deformable sleeve 350, according to another embodiment, that can be used in the guide wheel assembly 54 and/or the drive wheel assembly 38. The sleeve 350 has an outer surface 352 and a plurality of projections 354 extending outwardly from the outer surface 352. Each of the projections 354 in the illustrated configuration has an enlarged base that tapers into a cylindrically shaped upper portion. However, the projections 354 can have various other shapes, such as a square, rectangle, triangle, cone, pyramid, diamond, or various combinations thereof. The projections 354 can be arranged in rows of projections, for example axially extending rows of three projections each alternating with axially extending rows of two projections each as shown. Alternatively, the sleeve 350 can have an irregular pattern of projections 354 randomly positioned on the outer surface 352. The sleeve 350 can be made entirely of an elastomeric material (e.g., urethane or rubber) using suitable techniques. Alternatively, the sleeve 350 can have a non-deformable and non-elastomeric base layer and deformable projections made of an elastomeric material and secured to the base layer. In another embodiment, a sleeve can have a plurality of projections 354 (FIG. 14) and pockets 304 (FIG. 13), arranged in organized rows or randomly positioned on the outer surface of the sleeve.

Figure 14B:
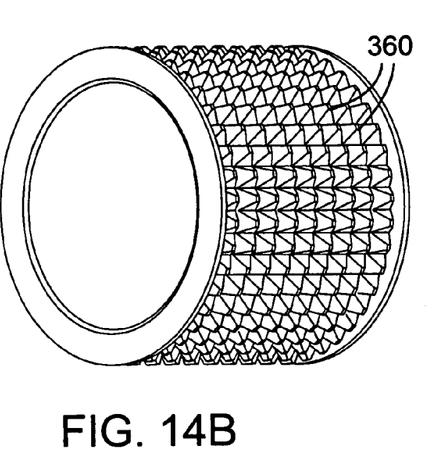

FIGS. 14B-14G show various other embodiments of sleeves having deformable projections for use in the guide wheel assembly 54 and/or the drive wheel assembly 38. FIG. 14B shows a sleeve having projections 360 that are generally frusto-pyramidal in shape. The projections 360 are aligned in axially and circumferentially extending rows with the base of each projection contacting the base of an adjacent projection on all four of its sides (except for the projections at the end of each axially extending row, which contact adjacent projections on only three sides thereof).

Figure 14C:
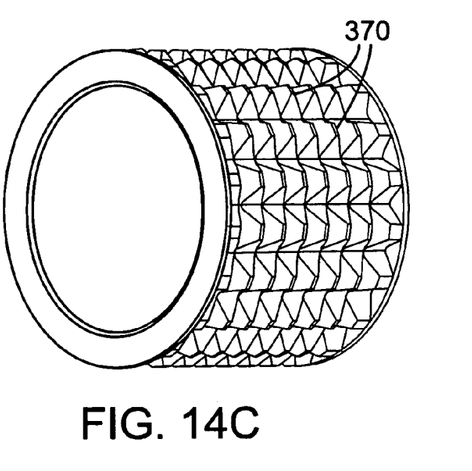

FIG. 14C shows a sleeve having generally frusto-pyramidal projections 370 elongated in the circumferential direction. The projections 370 are aligned in axially extending rows with the base of each projection 370 contacting the bases of adjacent projections in the same row (except for the projections 370 at the ends of each axially extending row, which contact an adjacent projection on only one side thereof). The projections 370 are also aligned in circumferentially extending rows with curved surfaces extending between the bases of adjacent projections in the same circumferentially extending row.

Figure 14D:
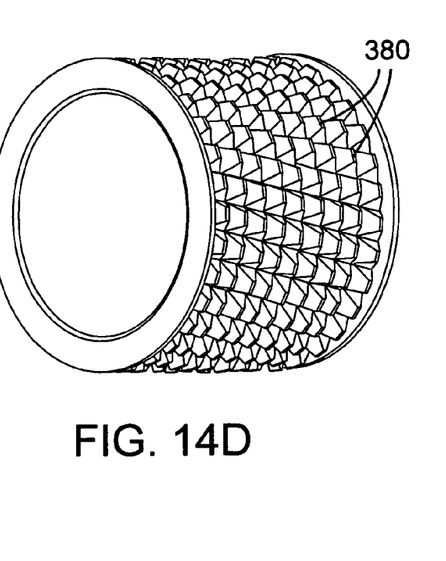

FIG. 14D shows a sleeve having generally frusto-pyramidal projections 380 and having a construction similar to the sleeve shown in FIG. 14B, except that the projections 380 are elongated in the circumferential direction. Also, the rows of projections extending between the ends of the sleeve are skewed slightly with respect to the longitudinal axis of the sleeve.

Figure 14E:
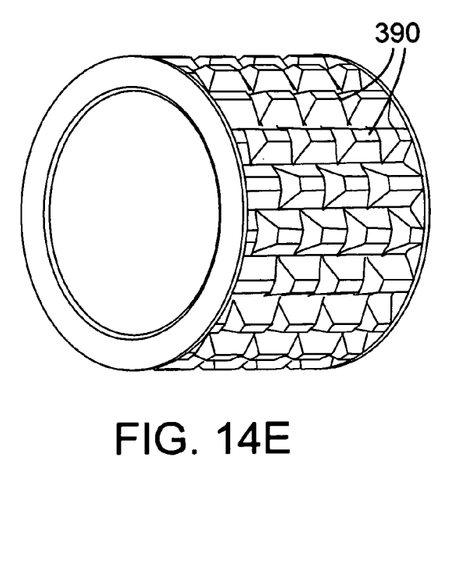

FIG. 14E shows a sleeve having generally frusto-pyramidal projections 390 that are elongated in the axial direction. The projections 390 are aligned in axially extending rows with the base of each projection 390 contacting the bases of adjacent projections in the same row (except for the projections 390 at the ends of each axially extending row, which contact an adjacent projection on only one side thereof). The projections 390 are also staggered or offset from projections in adjacent rows.

Figure 14F:
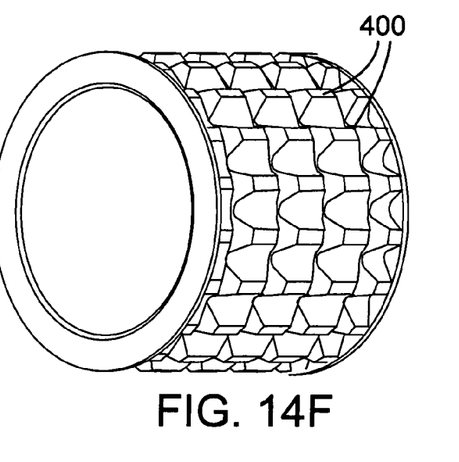

FIG. 14F show a sleeve having generally frusto-pyramidal projections 400 elongated in the axial direction and aligned in axially extending rows. The bases of the projections 400 in each axially extending row contact the bases of adjacent projections in the same row (except for the projections 400 at the ends of each axially extending row, which contact an adjacent projection on only one side thereof). The projections 400 are also aligned in circumferentially extending rows with curved surfaces extending between the bases of adjacent projections in the same circumferentially extending row.

Figure 14G:
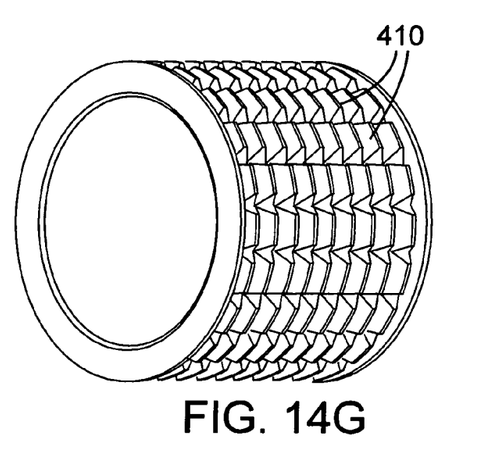

FIG. 14G shows a sleeve having generally frusto-pyramidal projections 410. The sleeve of FIG. 14G is similar to the sleeve shown in FIG. 14D except that the projections 410 are longer in the circumferential direction than the projections 380 shown in FIG. 14D.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A wheel assembly for an endless drive track of a drive track unit of an all-terrain vehicle, the wheel assembly comprising:
   a rotatable hub having an outer surface;
   at least first and second wheels mounted to opposite sides of the hub for engaging the track; and
   a sleeve extending around the outer surface of the hub, the sleeve having an outer surface inwardly spaced from the track, and defining a plurality of circumferentially spaced-apart, deformable projections configured to deform under externally applied pressure, thereby inhibiting accumulation of snow or ice on the outer surface of the sleeve.

2. The wheel assembly of claim 1, wherein the sleeve has an axially extending length and a plurality of axially extending cavities defined between adjacent projections and extending substantially the entire length of the sleeve.

3. The wheel assembly of claim 1, wherein each projection is elongated axially relative to the sleeve and includes first and second axially and radially extending side surfaces that converge toward each other in a direction extending radially outwardly of the sleeve.

4. The wheel assembly of claim 1, wherein the sleeve covers substantially the entire outer surface of the hub between the first and second wheels.

5. The wheel assembly of claim 1, wherein the outer surface of the hub is formed with one or more recesses to allow the sleeve to flex radially inwardly into the one or more recesses under external pressure applied to the outer surface of the sleeve.

6. The wheel assembly of claim 1, wherein the one or more recesses comprises first and second, axially spaced apart annular recesses that extend continuously around the hub and are separated by a flange portion of the hub, wherein the flange portion supports the sleeve between the recesses.

7. The wheel assembly of claim 1, wherein the wheel assembly comprises a guide wheel assembly and the first and second wheels comprise first and second guide wheels that engage an inside surface of the track.

8. The wheel assembly of claim 1, wherein the wheel assembly comprises a drive wheel assembly and the first and second wheels comprise first and second drive sprocket wheels, each including a plurality of circumferentially spaced track engaging members that drivingly engage the track.

9. The wheel assembly of claim 1, wherein the sleeve is made of an elastomeric material.

10. A guide wheel assembly for an endless drive track of a drive track unit of an all-terrain vehicle, the wheel assembly comprising:
    a rotatable hub having an outer surface;
    at least first and second axially spaced apart guide wheels coupled to the hub for engaging the track; and
    an elastomeric sleeve extending around the outer surface of the hub, the sleeve having an outer surface inwardly spaced from the track and defining a plurality of circumferentially spaced pockets elongated in a direction extending between opposite end portions of the sleeve, wherein flexure of the sleeve through contact with snow or ice is effective to inhibit the accumulation of snow or ice on the outer surface of the sleeve.

11. The wheel assembly of claim 10, wherein the pockets are defined by respective first and second adjacent sloped surfaces of the sleeve extending between the opposite end portions of the sleeve and converging toward each other in a radial outward direction.

12. The wheel assembly of claim 11, wherein each pocket includes a curved bottom surface extending between respective first and second sloped surfaces.

13. The wheel assembly of claim 10, wherein the hub comprises at least one continuous annular recess, the sleeve being capable of flexing radially inwardly into the recess under external pressure applied to the outer surface of the sleeve.

14. The wheel assembly of claim 10, wherein the pockets extend at least the majority of the length of the sleeve.

15. A wheel assembly for an endless drive track of a drive track unit of an all-terrain vehicle, the wheel assembly comprising:
  a rotatable hub having an outer surface;
  at least first and second track-engaging means for engaging a track trained about the wheel assembly, the first and second track-engaging means being coupled to the hub; and
  a flexible sleeve extending around the hub and covering substantially the entire surface of the hub outer surface between the first and second track-engaging means;
  wherein flexure of the sleeve through contact with snow or ice is effective to inhibit the adherence of snow or ice on the sleeve.

16. The wheel assembly of claim 15, wherein the flexible surface portion comprises a plurality of circumferentially spaced, flexible projections extending substantially the entire length of the sleeve.

17. The wheel assembly of claim 15, wherein the sleeve is made of a molded elastomeric material.

18. The wheel assembly of claim 15, wherein the sleeve is made of urethane.

19. A wheel assembly for an endless drive track of a drive track unit of an all-terrain vehicle, the wheel assembly comprising:
  a rotatable hub having an outer surface;
  at least first and second wheels coupled to opposite sides of the hub for engaging the track; and
  a sleeve extending around the outer surface of the hub and having an outer surface inwardly spaced from the track, the outer surface of the sleeve comprising a deformable surface portion, wherein external pressure on the sleeve during use causes the deformable surface portion to deform, thereby inhibiting the accumulation of snow or ice on the outer surface of the sleeve.

20. The wheel assembly of claim 19, wherein the deformable surface portion comprises a plurality of projections.

21. The wheel assembly of claim 20, wherein the sleeve comprises a one-piece monolithic construction.

22. A track unit for a track-driven all-terrain vehicle, the track unit comprising:
  a track frame;
  a rotatable drive wheel assembly being rotatably mounted to the frame;
  plural guide wheel assemblies being rotatably mounted to the frame;
  an endless track trained about the drive wheel assembly and the guide wheel assemblies and being drivingly engaged by the drive wheel assembly; and
  wherein at least one of the guide wheel assemblies comprises a rotatable hub, at least first and second guide wheels coupled to the hub and engaging the track, and an elastomeric sleeve covering the hub and having an outer surface formed with a plurality of circumferentially spaced, axially extending pockets, and wherein deformation of the sleeve through contact with snow or ice is effective to inhibit the adherence of snow or ice on the outer surface of the sleeve.

23. The track unit of claim 22, wherein the drive wheel assembly and the guide wheel assemblies support the endless track in a generally triangular configuration with the drive wheel assembly at the apex of the configuration and the guide wheel assemblies spaced apart along the base of the configuration so that the endless track defines a terrain-engaging lower track run.

24. The track unit of claim 22, wherein the drive wheel assembly comprises:
  a rotatable hub;
  first and second axially spaced drive sprocket wheels coupled to the hub, each including a plurality of circumferentially spaced track engaging members that drivingly engage the track; and
  an elastomeric drive wheel sleeve covering the hub between the sprocket wheels and having an outer surface formed with a plurality of circumferentially spaced, axially extending pockets, and wherein deformation of the drive wheel sleeve through contact with snow or ice is effective to inhibit the adherence of snow or ice on its outer surface.

* * * * *